(12) United States Patent
Kieffer et al.

(10) Patent No.: US 11,584,024 B2
(45) Date of Patent: Feb. 21, 2023

(54) EASY COLLABORATIVE TOOL CHANGER

(71) Applicant: ONROBOT A/S, Odense (DK)

(72) Inventors: Lasse Kieffer, Odense (DK); Peter Nadolny Madsen, Tommerup (DK); Henrik Tillitz Hansen, Nyborg (DK)

(73) Assignee: ONROBOT A/S, Odense (DK)

( * ) Notice: Subject to any disclaimer, the term of this patent is extended or adjusted under 35 U.S.C. 154(b) by 368 days.

(21) Appl. No.: 16/901,394

(22) Filed: Jun. 15, 2020

(65) Prior Publication Data

US 2020/0306996 A1     Oct. 1, 2020

Related U.S. Application Data

(63) Continuation of application No. PCT/DK2018/050292, filed on Nov. 8, 2018.

(30) Foreign Application Priority Data

Dec. 14, 2017    (DK) ........................... PA 2017 00710
Apr. 6, 2018    (DK) ........................... PA 2018 00149

(51) Int. Cl.
    *B25J 15/00*        (2006.01)
    *B25J 15/04*        (2006.01)
    *B25J 15/06*        (2006.01)

(52) U.S. Cl.
CPC ....... *B25J 15/0441* (2013.01); *B25J 15/0061* (2013.01); *B25J 15/0408* (2013.01); *B25J 15/0625* (2013.01); *B25J 15/0616* (2013.01)

(58) Field of Classification Search
CPC . B25J 15/0441; B25J 15/0616; B25J 15/0061
(Continued)

(56) References Cited

U.S. PATENT DOCUMENTS 4,858,974 A * 8/1989 Stannek ............... B25J 15/0616
                                                               294/902
10,047,908 B1 * 8/2018 Bohle, II ................. G05B 9/02
(Continued)

FOREIGN PATENT DOCUMENTS

CN        206529037 U    9/2017
DE         4215106 C1    6/1993
(Continued)

OTHER PUBLICATIONS

International Patent Application No. PCT/DK2018/050292, International Search Report (ISR) and Written Opinion dated Feb. 19, 2019—8 pages.
(Continued)

*Primary Examiner* — Paul T Chin
(74) *Attorney, Agent, or Firm* — Lathrop GPM LLP

(57) ABSTRACT

A connector (70) for mechanically connecting a device (2) to a robot (20), wherein the connector (70) comprises a first portion (74) configured to be attached to the robot (20) and a second portion (76) configured to be attached to a device (2) configured to be connected to the robot (20). The first portion (74) and the second portion (76) are detachably attached to each other by a first connection portion (1) constituting a rotational system comprising a pivot (116) about which the first portion (74) can rotate with respect to the second portion (76) and a second connection portion (1') constituting a mechanical locking structure that prevents the first portion (74) and the second portion (76) from being detached from each other.

15 Claims, 6 Drawing Sheets

(58) Field of Classification Search
USPC .................................................. 294/213, 65
See application file for complete search history.

(56) References Cited

U.S. PATENT DOCUMENTS

| | | | | |
|---|---|---|---|---|
| 10,335,957 | B2* | 7/2019 | Zachary | B25J 15/0416 |
| 10,391,723 | B2* | 8/2019 | Stone | B25J 9/126 |
| 11,254,013 | B2* | 2/2022 | Safeldt | B25J 19/0029 |
| 11,364,641 | B2* | 6/2022 | Kieffer | B25J 15/0061 |
| 11,383,392 | B2* | 7/2022 | Lorenz | B25J 15/0675 |
| 2006/0088367 | A1* | 4/2006 | Dellach | F16L 39/00 |
| | | | | 901/30 |
| 2007/0235949 | A1* | 10/2007 | Gloden | B25J 15/04 |
| | | | | 279/2.12 |
| 2014/0197652 | A1 | 7/2014 | Wang et al. | |
| 2014/0363223 | A1 | 12/2014 | Goto et al. | |
| 2016/0089780 | A1* | 3/2016 | Marttinen | B25J 15/0061 |
| | | | | 901/23 |
| 2016/0236357 | A1 | 8/2016 | Kalb et al. | |
| 2017/0348861 | A1 | 12/2017 | Kikuchi et al. | |
| 2022/0072716 | A1* | 3/2022 | Kaul | B25J 19/0033 |

FOREIGN PATENT DOCUMENTS

| | | |
|---|---|---|
| DE | 197 34 832 C1 | 10/1998 |
| DE | 20 2016 003670 U1 | 6/2016 |
| WO | WO 9612137 A1 | 4/1996 |
| WO | WO 2006/001762 A1 | 1/2006 |
| WO | WO 2017/040803 A1 | 3/2017 |

OTHER PUBLICATIONS

Danish Patent Application No. PA 2017 00710, Search Report completed May 1, 2018—4 pages.
Danish Patent Application No. PA 2018 00149, Search Report completed Jul. 18, 2018—3 pages.

\* cited by examiner

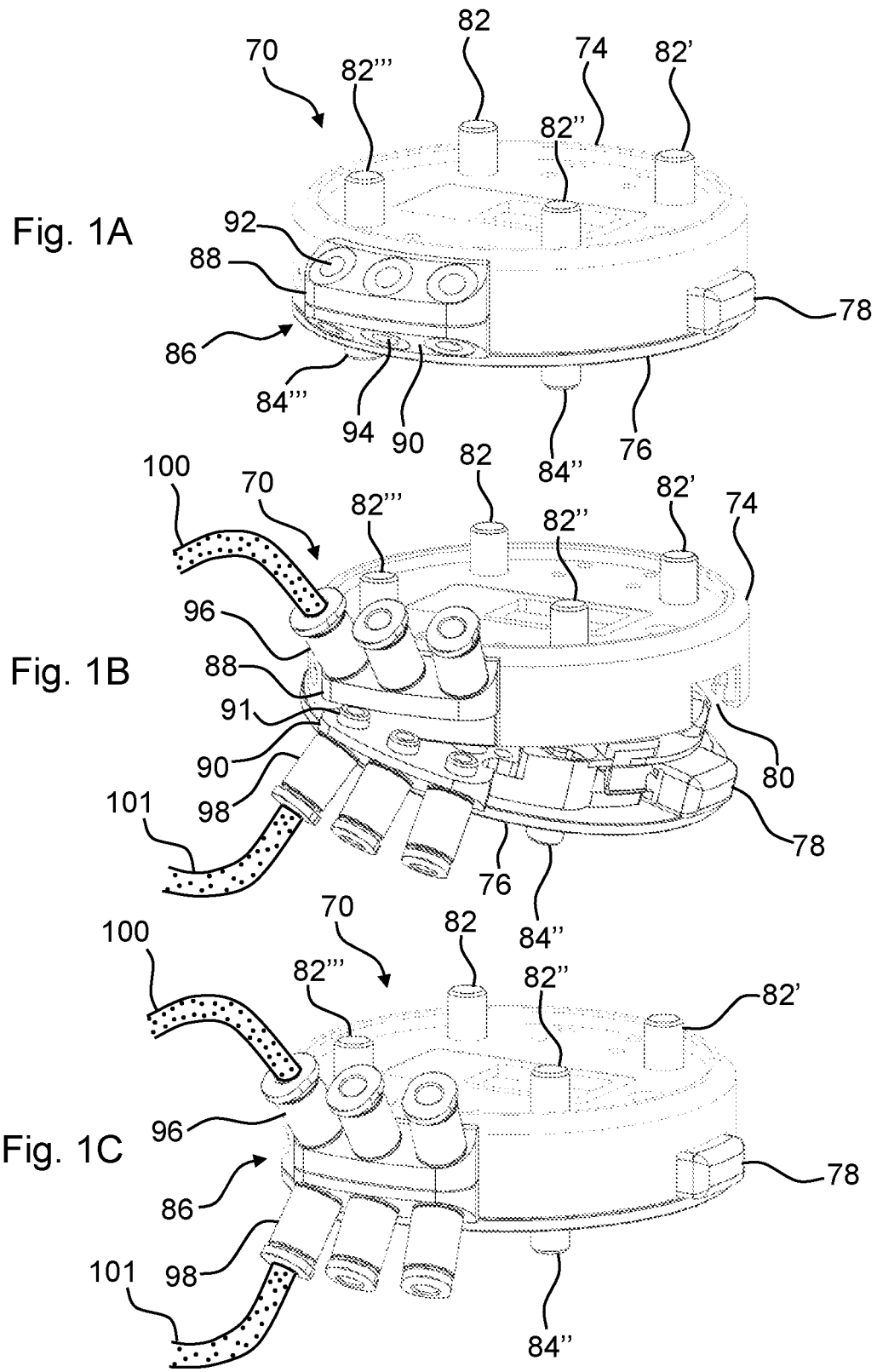

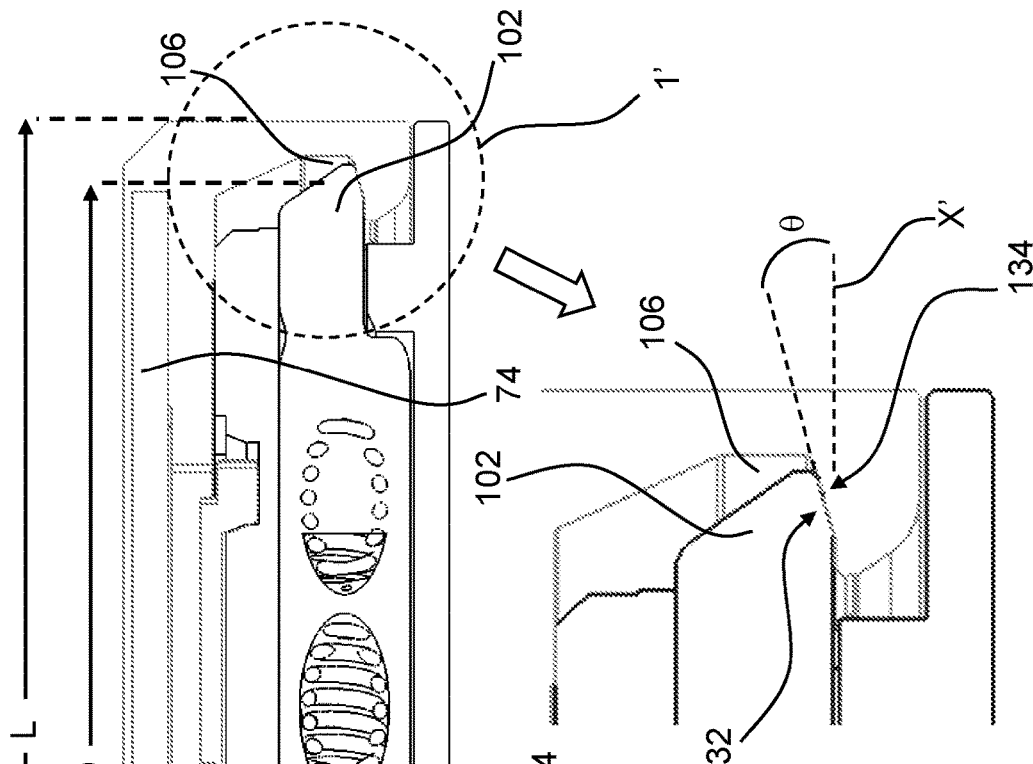
Fig. 4A
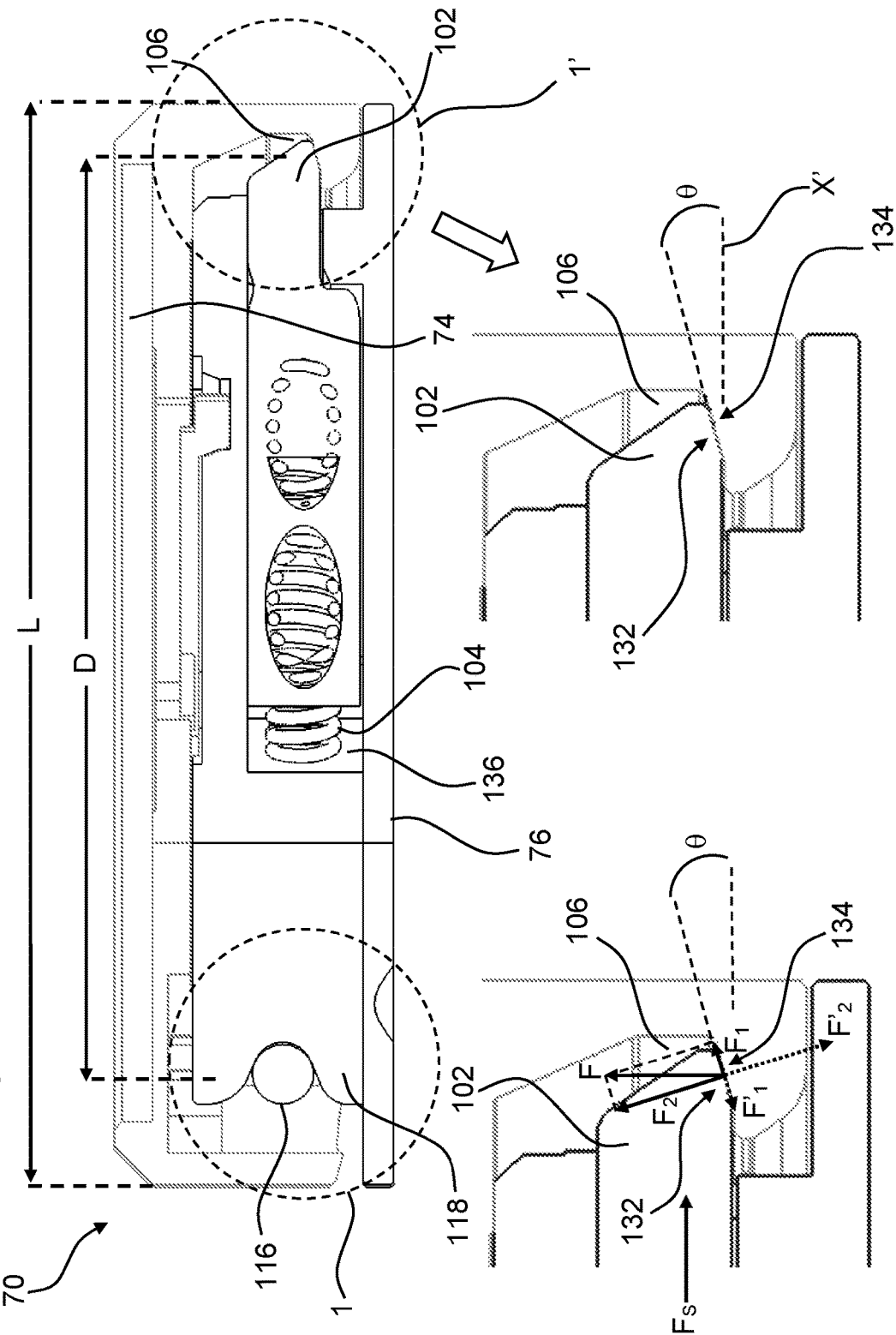
Fig. 4B
Fig. 4C

EASY COLLABORATIVE TOOL CHANGER

CROSS-REFERENCE TO RELATED APPLICATIONS

This application is a continuation of International Patent Application No. PCT/DK2018/050292, filed Nov. 8, 2018, which claims the benefit of priority to Danish Patent Application No. PA 2017 00710 filed Dec. 14, 2017, and Danish Patent Application No. PA 2018 00149 filed Apr. 6, 2018, each of which is incorporated herein by reference in its entirety.

FIELD OF INVENTION

The present invention relates to a connector for mechanically connecting a device to a collaborative robot, wherein the connector comprises a first portion configured to be attached to the robot and a second portion configured to be attached to the device.

PRIOR ART

Robots and in particular collaborative robots that are intended to physically interact with humans in a shared workspace are being introduced in new working areas. When collaborative robots are applied for various tasks, a tool (e.g. a gripping device) has to be connected to the robot. In order to be able to attach the tool to the robot in a fast and reliable manner, connectors for this purpose have been developed.

It is, however, time consuming to connect an externally arranged vacuum source to the gripping device, connect the gripping device to the robot and connect a controlling device to the gripping device. Accordingly, it would be desirable to have a simple and less demanding gripping device.

Many of the prior art connectors, however, are complicated and expensive. Therefore, it would be desirable to have a connector that is simple to user and less expensive than the prior art connectors.

US 20060088367 A1 discloses a quick disconnect tooling apparatus for releasably latching an end effector tool to a manipulator. The quick disconnect tooling apparatus comprises a releasable latch is connected to the base module and is moveable between a latched position, wherein the latch cooperatively engages a latch pin connected to the tool module to secure the tool module to the base module and allow the first and second portions of the power source coupling to communicate with one another, and an unlatched position. The latch takes up a significant amount of space and thus the quick disconnect tooling apparatus has to be rather thick. Accordingly, it would be desirable to be able to provide an alternative solution that allows for providing a thinner connector.

It is an object of the present invention to provide an alternative to the prior art connectors, which alternative connector reduces or even eliminates the above-mentioned disadvantages of the prior art. It is an object to the invention to provide a connector that is thinner than the prior art connectors.

It is also an object of the present invention to provide a connector that is configured to connect a device such as a gripping device to a robot in an easy and user-friendly manner.

SUMMARY OF THE INVENTION

The object of the present invention can be achieved by a connector as defined in claim 1. Preferred embodiments are defined in the dependent subclaims, explained in the following description and illustrated in the accompanying drawings.

The connector according to the invention is a connector for mechanically connecting a device to a robot, wherein the connector comprises a first portion configured to be attached to the robot and a second portion configured to be attached to a device configured to be connected to the robot, wherein the first portion and the second portion are detachably attached to each other by means of:

a) a first connection portion constituting a rotational system comprising a pivot, about which the first portion can rotate with respect to the second portion and b) a second connection portion constituting a mechanical locking structure that prevents the first portion and the second portion from being detached from each other, wherein the second connection portion comprises:

a protruding structure having at least one contact surface and a longitudinal axis and a receiving recess formed by at least one contact surface configured to bear against the at least one contact surface of the protruding structure, wherein the surfaces are angled relative to the longitudinal axis in such a manner that the friction force between the contact surfaces has a magnitude that ensures that the resulting force acting on the protruding structure is sufficiently large to keep the protruding structure in engagement with the recess.

Hereby, it is possible to provide a connector that is thinner than the prior art connectors, simple to user and less expensive than the prior art connectors. The connector according to the invention is configured to connect a device such as a gripping device to a robot in an easy and user-friendly manner, wherein the connection portion constitutes a mechanical locking structure that prevents the first portion and the second portion from being detached from each other, wherein the mechanical locking is self-locking.

The first portion is configured to be attached to the robot. This may be accomplished by using any suitable attachment means. In one embodiment according to the invention, the attachment means are screws, or structures configured to engage with screws.

The second portion is configured to be attached to a device configured to be connected to the robot. The attachment may be achieved by means of any suitable attachment means. In one embodiment according to the invention, the attachment means are screws, or structures configured to engage with screws.

The first portion and the second portion are detachably attached to each other by means of a first connection portion constituting a rotational system comprising a pivot, about which the first portion can rotate with respect to the second portion. The rotational system may be of any suitable type allowing the first portion and the second portion to be rotatably attached to each other. In one embodiment, the rotational system is a ball and socket joint. In another embodiment, the rotational system is a hinge joint. In a further embodiment, the rotational system is a saddle joint. In one embodiment the pivot is a pin. In another embodiment the pivot is a hemisphere. In a further embodiment the pivot is ball. In an even further embodiment the pivot is a point. In another embodiment the pivot is a shaft.

In a preferred embodiment, the rotational system comprises a protruding structure (a male structure) and an engagement structure (e.g. a protruding structure) rotatably attached thereto.

In one embodiment, the mechanical locking structure is provided by means of a first portion comprising a protruding structure that is configured to be brought into engagement with a corresponding receiving recess provided in the second portion.

In another embodiment, the mechanical locking structure is provided by means of a second portion comprises a protruding structure that is configured to be brought into engagement with a corresponding receiving recess provided in the first portion.

Hereby, it is possible to provide an easy, fast and user-friendly connection of a tool to a robot by using the connector according to the invention.

The connector according to the invention comprises a first portion configured to be attached to a robot and a second portion configured to be attached to a device (e.g. a gripping device). The second portion may be configured to be attached to any device suitable of being connected to a robot.

In one embodiment according to the invention, the connector comprises one or more screws protruding from a base structure of the first portion of the connector, wherein said screws are adapted to be screwed into corresponding threaded holes in the robot.

In one embodiment according to the invention, the connector comprises one or more screws protruding from a base structure of the second portion of the connector, wherein said screws are adapted to be screwed into corresponding threaded holes in a device (e.g. a gripping device) configured to be connected to the robot.

It may be beneficial that the first connection portion constitutes a pivot joint, preferably a pivot joint comprising a first pivot structure and a second engaging pivot structure arranged to rotate with respect to the first pivot structure. Hereby, it is possible to provide a simple and reliable rotatable attachment between the first portion and the second portion.

In one embodiment, the first portion comprises a protruding structure that is configured to be brought into engagement with a corresponding receiving recess provided in the second portion.

In a further embodiment, the second portion comprises a protruding structure that is configured to be brought into engagement with a corresponding receiving recess provided in the first portion.

It is possible to have one or more connection pipes protruding from the base structure of the second portion of the connector extend in extension of each other in a pairwise manner so that there is access through the connector through the corresponding connection pipes. Hereby, electrical connections such as wires, cables with multiple wires and cables or tubes may be connected through the connection pipes.

It may be beneficial that the connector comprises an adaptor comprising a first connection part and a second part, wherein the adapter comprises one or more connection structures configured to connect the distal end of a first pipe or cable with the distal end of a second pipe or cable. Hereby, it is possible to keep track of pipes and cables that must be connected to the device and to the robot, to which the device has to be attached.

By the term pipe is meant any tubular structure through which a fluid (liquid or gas) can flow. Accordingly, a pipe may be a hollow cylinder of metal, wood, or other material configured for the conveyance of a fluid. A pipe may also be a tube or hose of any material allowing the tube to guide a fluid through the tube.

It is preferred that the adaptor is configured to allow adjacent ends of pipes or cables to be attached to each other in a manner in which a continuous flow of resources (e.g. electrical current or fluid) between the pipes or cables can be accomplished.

In one embodiment, the connector comprises a detachably attached adaptor comprising a first connection part and a second part, wherein the adapter comprises one or more connection structures configured to connect the distal end of a first pipe or cable with the distal end of a second pipe or cable.

If the adaptor is used to connect pipes for transport of a fluid such as a gas or a liquid, it is preferred that the adaptor comprises one or more sealing structures configured to seal the pipes against the surrounding structures. Hereby, it is possible to provide a reliable connection.

In one embodiment, the sealing structures are structures configured to be radially expanded upon being axially compressed. In another embodiment, the sealing structures are structures configured to be axially expanded upon being radially compressed.

It may be an advantage that the first portion and the second portion are provided with corresponding engagement structures constituting a snap-fit connection. Hereby, the first portion and the second portion can be attached to each other in an easy and fast manner. Accordingly, it is possible to enable an easy, fast and user-friendly attachment and detachment of a device (e.g. a gripping device) to a robot.

By the term snap-fit connection is meant connection (an attachment feature) comprising interlocking components configured to be pressed together into a locking configuration. Hereby, the snap-fit connection can provide a fast way to mechanically lock the first portion to the second portion.

It may be beneficial that the connector comprises a slideably arranged press element arranged to unlock the engagement structures from each other by moving (e.g. translating such as pressing) the press element. Hereby, the press element can be used to bring the engagement structures in a configuration in which the connector can be disassemble due to the relative position of the engagement structures. This property is important when the connector has to be split into the first portion and the second portion. The press element may be configured and arranged to be moved manually (e.g. by pressing the press element). Alternatively, the connector may comprise an actuator (e.g. an electrical actuator or a pneumatic actuator) adapted to generate motion of the press element. The actuator may be an electrical motor by way of example.

In one embodiment, the connector comprises a slideably arranged pull element arranged to unlock the engagement structures from each other by moving (e.g. pulling) the pull element. Hereby, the first portion and the second portion may be brought out of engagement by means of the pull element. The pull element may be configured and arranged to be moved manually (e.g. by pulling the pulling element). The connector may, alternatively, comprise an actuator (e.g. an electrical actuator such as an electrical motor or a pneumatic actuator) configured to move the pull element.

In a further embodiment, the connector comprises a rotatably arranged rotation element that is arranged to unlock the engagement structures from each other by rotating (e.g. sliding along an arced structure or path) the rotation element. Hereby, the first portion and the second portion may be brought out of engagement by means of the rotation element. The rotation element may be configured and arranged to be moved manually (e.g. by pulling, pushing or rotating the rotation element). Alternatively, the connector comprises may comprise an actuator (e.g. an electrical actuator such as an electrical motor or a pneumatic actuator) arranged and configured to pull, push or rotate the rotation element.

The movement of the press element, the pull element or the rotation element may include moving the press element, the pull element or the rotation element along any suitable structure or path. It is possible to move the press element along a structure or path comprising one or more straight and/or arced portions. Likewise, it is possible to move the pull element along a structure or path comprising one or more straight and/or arced portions. Likewise, it is possible to move the rotation element along a structure or path comprising one or more straight and/or arced portions. It is possible to move the press element, the pull element or the rotation element along a structure or path comprising at least a portion of a "S"-shaped curve or sigmoid curve, a sine curve, a hyperbola, a parabola or an elliptic curve.

It may be an advantage that the connector is configured to receive one or more adaptors. Hereby, it is possible to provide a detachably attachment of the one or more adaptors to the connector.

It may be beneficial that the connector comprises one or more receiving structures configured to receive one or more corresponding attachment portions (e.g. attachment plates) of the adaptor. Hereby, it is possible to provide a simple, fast and reliable attachment of the adaptor to the connector.

In one embodiment, the first portion of the connector comprises one or more receiving structures configured to receive one or more corresponding attachment portions (e.g. plates) of the adaptor.

In another embodiment, the second portion of the connector comprises one or more receiving structures configured to receive one or more corresponding attachment portions (e.g. plates) of the adaptor.

In a preferred embodiment, both the first portion and the second portion of the connector comprises one or more receiving structures configured to receive one or more corresponding attachment portions (e.g. plates) of the adaptor.

It may be an advantage that the connector comprises a slot provided in the outer structure of the first portion or the second portion, wherein the slot is configured to receive a press element, a rotation element or a pull element protruding from the first portion or the second portion. Hereby, it is possible to provide a compact connector.

It may be beneficial that the first portion comprises a protruding structure that is configured to be brought into engagement with a corresponding receiving recess provided in the second portion or that the second portion comprises a protruding structure that is configured to be brought into engagement with a corresponding receiving recess provided in the first portion. Herby, it is possible to fix the second portion relative to the first portion and hereby restrict rotation of the second portion relative to the first portion.

It may be an advantage that the protruding structure is part of a slidably arranged press element provided in a track structure. Hereby, it is possible to control the engagement of the protruding structure and the corresponding receiving recess by means of the press element.

It may be beneficial that a spring is arranged in the end portion of the track structure and exerts an outwardly directed force on the protruding structure. Hereby, the press element is kept in lockingly engagement with the receiving recess until the force is exceeded by an opposing directed force applied to press the press element into (e.g. in a direction towards the central portion of) the connector. Accordingly, upon providing a force towards the press element, the protruding structure will be moved radially inwards and the protruding structure will be brought out of engagement with the receiving recess.

It may be an advantage that the first portion comprises a detachably attached plate allowing mounting of an adaptor or that the second portion comprises a detachably attached plate allowing for mounting of an adaptor.

Hereby, it is possible to attach the adaptor in an easy and reliably manner by means of the detachably attached plate.

It may be beneficial that the first connection portion is provided in a position, provided in a distance larger than half the length of the connector from the second connection portion.

It may be an advantage that the first connection portion is provided in a position, provided in a distance larger than two thirds of the length of the connector from the second connection portion.

It may be beneficial that the first connection portion is provided in a position, provided in a distance larger than three fourths of the length of the connector from the second connection portion.

By providing the first connection portion in the opposite side of the connector than the second connection portion, attachment of the first portion and the second portion can be eased.

In a preferred embodiment, the connector comprises a detachably attached adaptor comprising a first part and a second part, wherein the adapter is configured to establish a connection between separated cables or pipes that have to be connected to deliver a flow of resources (e.g. an electrical current or a fluid) between the robot and the device that is (or is to be) connected to the robot.

It may be an advantage that the first part is provided with one, two, three or more holes extending through the first part and further extending through corresponding structures of the second part that hereby constitutes the hole(s).

The adaptor is adapted to connect pipes, wires or cables with multiple wires from the robot and the device being attached to the robot by means of the connector. Thus, by means of the adaptor, it is possible to connect electrical connections by using electrical wires, cables with multiple wires or tubes (e.g. air tubes) between the robot and the device.

It may be an advantage that the connector is configured to receive several adaptors being detachably attached to the connector.

The adaptor may comprise connection structures enabling that adjacent pipe ends, or adjacent cable ends or electrical connection elements can be connected. Hereby, it is possible to apply the adaptor to establish connection between single wires, cables with multiple wires or pipes from the robot and the gripping device or an alternative device, respectively.

It may be an advantage that the press element is slideably arranged in a manner, in which corresponding engagement structures of the first portion and the second portion, respectively, are brought out of engagement upon pressing and hereby sliding the press element.

It may be beneficial that the pull element is slideably arranged in a manner in which corresponding engagement structures of the first portion and the second portion, respectively, are brought out of engagement upon pulling and hereby sliding the press element.

In one embodiment the connector comprises a rotating element that is rotatably arranged in a manner in which corresponding engagement structures of the first portion and the second portion, respectively, are brought out of engagement upon rotation of the rotation element.

It may be advantageous that the first portion comprises a protruding structure that is configured to be brought into engagement with a corresponding receiving recess provided in the second portion. Hereby, it is possible to provide a mechanical locking structure in an easy manner.

Alternatively, the second portion may comprise a protruding structure that is configured to be brought into engagement with a corresponding receiving recess provided in the first portion. Hereby, it is possible to provide a mechanical locking structure in a simple manner.

The protruding structure may be a part of a slidably arranged press element provided in a track structure.

It may be beneficial that a spring is arranged in the end portion of the track structure and exerts an outwardly directed force on the press element. Hereby, the press element is kept in lockingly engagement with the receiving recess until the force is exceeded by an opposing directed force applied to press the press element into (e.g. in a direction towards the central portion of) the connector. Hereby, the protruding structure will be moved radially inwards and the protruding structure will be brought out of engagement with the receiving recess.

It may be an advantage that the first portion and the second portion are detachably attached to each other by means of a hinge comprising a pivot and a joint structure rotatably and detachably attached to the pivot.

It may be an advantage that the first portion comprises a detachably attached plate allowing mounting of an adaptor. Hereby, the plate can be removed in case that an adaptor is intended to be detachably attached to the first portion of the connector.

Alternatively, the second portion comprises a detachably attached plate allowing mounting of an adaptor. Hereby, the plate can be removed in case that an adaptor is intended to be detachably attached to the second portion of the connector.

It may be an advantage that the first portion comprises a base and an outer wall extending thereof, wherein the outer wall has a cylindrical shape. The outer wall may have a circular cross section. In another embodiment, the cross section of the outer wall is rectangular (e.g. square). The second portion may preferably comprise a receiving portion configured and shaped to receive the outer wall of the first portion. Alternatively, the second portion may comprise a base and an outer wall extending thereof, wherein the outer wall has a cylindrical shape. The outer wall may have a circular cross section. In another embodiment, the cross section of the outer wall is rectangular (e.g. square). The first portion may preferably comprise a receiving portion configured and shaped to receive the outer wall of the second portion.

In one embodiment according to the invention the second connection portion comprises:
- a protruding structure having at least one planar contact surface and a longitudinal axis and
- a receiving recess formed by at least one contact surface configured to bear against the at least one contact surface of the protruding structure, wherein the surfaces are angled relative to the longitudinal axis with an angle that is smaller than the inverse tangent function of the coefficient of friction between the contact surfaces bearing against each other.

It is preferred that the contact surface of the protruding structure is planar. It is also preferred that the contact surface of the receiving recess is planar.

DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 1A shows a connector according to the invention in closed configuration;

FIG. 1B shows the connector shown in FIG. 1A in an open configuration, in which an air tube extends through an adaptor integrated in the connector;

FIG. 1C shows the connector shown in FIG. 1B in a closed configuration;

FIG. 4A shows a cross-sectional view of a connector according to the invention;

FIG. 4B shows a close-up view of a portion of the connector shown in FIG. 4A;

FIG. 4C shows forces exerted to the surfaces of the protruding structure and receiving recess of the connector shown in FIG. 4B;

DETAILED DESCRIPTION OF THE INVENTION

Figure 2A:
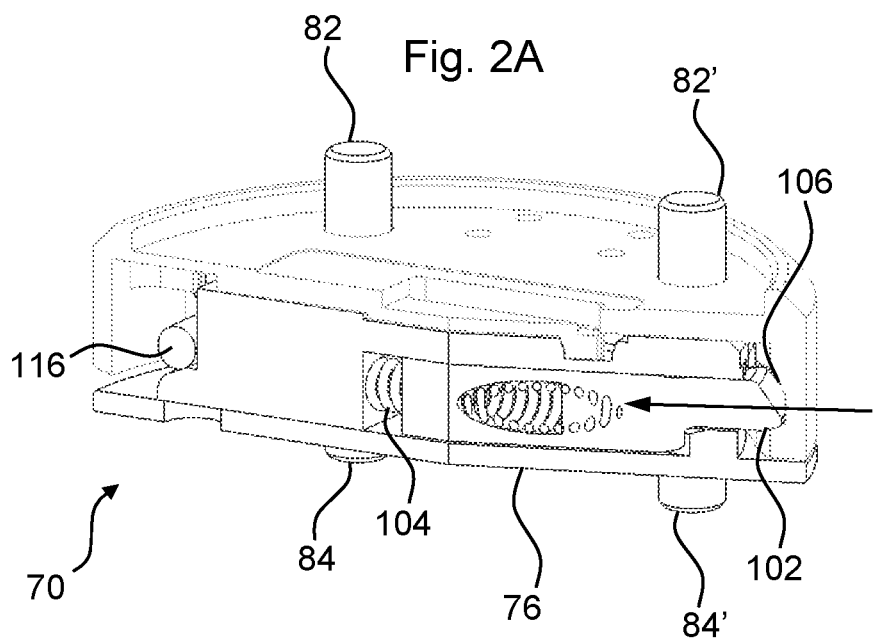
FIG. 2A shows a cross-sectional view of a connector according to the invention.

Referring now in detail to the drawings for the purpose of illustrating preferred embodiments of the present invention, a connector 70 of the present invention is illustrated in FIG. 1A.

FIG. 1A illustrates a connector 70 according to the invention in closed configuration. The connector 70 comprises a first portion 74 configured to be (detachably or permanently) attached to a robot and a second portion 76 configured to be (detachably or permanently) attached to a gripping device or to another device (not shown).

A plurality of screws 82, 82', 82", 82''' protrude from a central planar base structure of the first portion 74 of the connector 70. Likewise, a plurality of screws 84", 84''' protrude from a structure of the second portion 74 of the connector 70. The screws 82, 82', 82", 82''', 84", 84''' extend in extension of each other in a pairwise manner so that there is access through the connector 70, through the pairwisely corresponding screws 82, 82', 82", 82''', 84", 84'''. Accordingly, electrical connections (e.g. wires or cables with multiple wires), or tubes may be connected through said screws 82, 82', 82", 82''', 84", 84'''.

The first portion 74 and the second portion 76 are provided with corresponding engagement structures enabling an easy, fast and user-friendly attachment and detachment of said first portion 74 and second portion 76. A press element 78 is arranged to unlock the engagement structures from each other, when the connector 70 has to be disassemble (split into two pieces).

The connector 70 comprises a detachably attached adaptor 86 comprising a first part 88 and a second part 90. The first part 88 is provided with three holes 92 extending through the first part 88 and further extending through corresponding structures of the second part 90 hereby constituting holes 94. Accordingly, the adaptor 86 is adapted to connect pipes, wires or cables with multiple wires from a robot and the device being attached to the robot by means of the connector 70. Accordingly, by means of the adaptor 86, it is possible to connect electrical connections (by using electrical wires or cables with multiple wires) or tubes (e.g. air tubes) between said robot and device.

FIG. 1B shows the connector 70 shown in FIG. 1A in an open configuration, in which a first air tube 100 is attached to the first part 88 of an adaptor 86 attached to the connector 70. A second air tube 101 is attached to the second part 90 of the adaptor 86. When the first part 88 and the second part 90 are attached to each other, the first air tube 100 and the second air tube 101 are sealingly brought into fluid communication with other. Accordingly, air can flow between the first air tube 100 and the second air tube 101. The sealing structure used (not shown) may be configured to be radially expanded upon being axially compressed.

Alternatively, the sealing structures are structures may be configured to be axially expanded upon being radially compressed. The first air tube 100 extends through a portion of a first fitting 96 protruding from a hole in first part 88 the adaptor. The second air tube 101 extends through a portion of a second fitting 98 protruding from a hole in second part 90 of the adaptor.

It is possible to electrically connect one or more electrical wires of a first cable (not shown) with one or more electrical wires of a second cable (not shown) by means of the adaptor 86. The distal portion of the first cable can be inserted into one of the fittings 96 the first part 88, whereas the distal portion of the second cable can be inserted into one of the fittings 98 the second part 90.

The fittings 96, 98 may comprise corresponding electric coupling structures (not shown) allowing electrical connection of the distal portion of the first cable and the distal portion of the second cable.

Accordingly, the adaptor 86 makes it possible to connect pipes 100, 101 and electrical cables in a fast, realisable and user-friendly manner.

The first portion 74 and the second portion 76 are detachably attached to each other by means of a hinge (comprising a pin/shaft and a structure rotatably attached thereto, see FIG. 2A). A slot 80 is provided in the outer structure of the first portion 74. The slot 80 is configured to receive the press element 78.

The connector 70 comprises a first connection portion (the hinge) constituting a rotatably attachment and a second connection portion constituting a mechanical locking structure that prevents the first portion 74 and the second portion 76 to be detached from each other.

FIG. 1C shows the connector 70 shown in FIG. 1B in a closed configuration. The press element 78 is slideably arranged hereby allowing corresponding engagement structures of the first portion 74 and the second portion 76, respectively, to be brought out of engagement.

FIG. 2A shows a cross-sectional view of a connector 70 according to the invention. The connector 70 comprises a first portion 74 and a second portion 76. The second portion 76 comprises a protruding structure 102 that is brought into engagement with a corresponding receiving recess 106 provided in the first portion 74.

The protruding structure 102 is part of a slidably arranged press element (see FIG. 1A, FIG. 1B and FIG. 1C) provided in a track structure. A spring 104 is arranged in the end portion of the track structure and exerts an outwardly directed force on the press element. Hereby, the press element is kept in a locking engagement with the receiving recess 106 until the force is exceeded by an opposing directed force applied to press the press element in a direction towards the central portion of the connector 70. Hereby, the protruding structure 102 will be moved radially inwards and the protruding structure 102 will be brought out of engagement with the receiving recess 106. Accordingly, the protruding structure 102 and the receiving recess 106 form a second connection portion constituting a mechanical locking structure that prevents the first portion 74 and the second portion 76 to be detached from each other.

The first portion 74 and the second portion 76 are detachably attached to each other by means of a hinge comprising a shaft (pin) 116 and a structure (not shown) rotatably and detachably attached to the shaft 116.

Figure 2B:
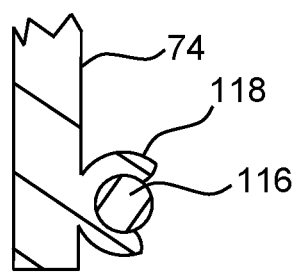
FIG. 2B shows an engagement structure of a first portion rotatably attached to a shaft of a second portion of a connector.

FIG. 2B illustrates an engagement structure 118 of a first portion 74 rotatably attached to a shaft (pin) 116 of a second portion of a connector according to the invention. It can be seen, that the engagement structure 118 enables rotation of the first portion 74 relative to the pivot 116 and thus the second portion of a connector. By initially bringing the engagement structure 118 of a first portion 74 into engagement with the shaft (pin) 116, it is possible to rotate the first portion relative to the second portion hereby bringing the connector from an open configuration (as shown in FIG. 1B) into a closed configuration (as shown in FIG. 1C).

It is possible to arrange the shaft (pin) 116 in the first portion of the connector and the engagement structure 118 in the second portion of the connector if desirable.

Figure 2C:
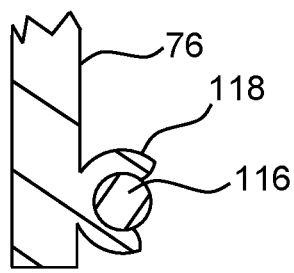
FIG. 2C shows an engagement structure of a second portion rotatably attached to a shaft of a first portion of a connector.

FIG. 2C illustrates a solution that basically corresponds to the one shown in FIG. 2B. The engagement structure 118 is, however a component of a second portion 76 rotatably attached to a shaft (pin) 116 of a first portion of a connector according to the invention.

Figure 3C:
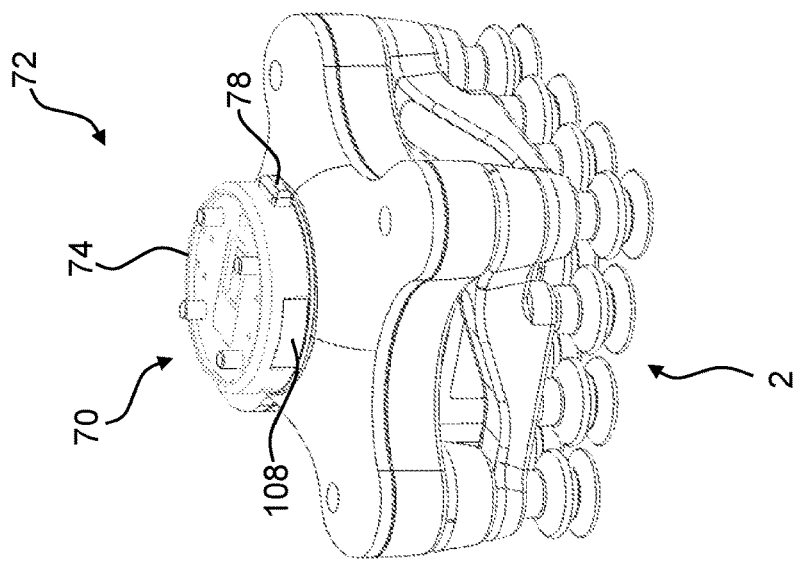
FIG. 3C shows the system shown in FIG. 3B, in a configuration in which the connector has been closed.
Figure 3B:
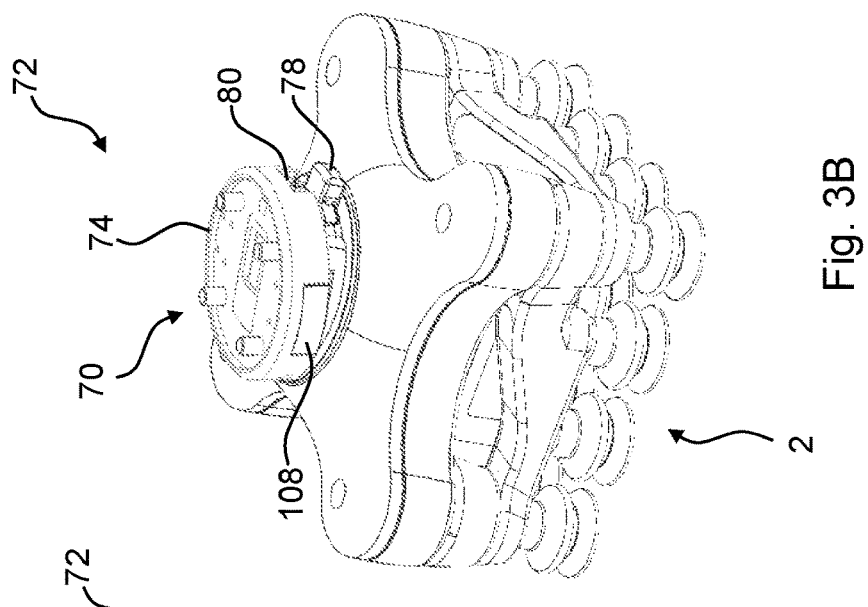
FIG. 3B shows the system shown in FIG. 3A, in a configuration in which the connector is being closed.
Figure 3A:
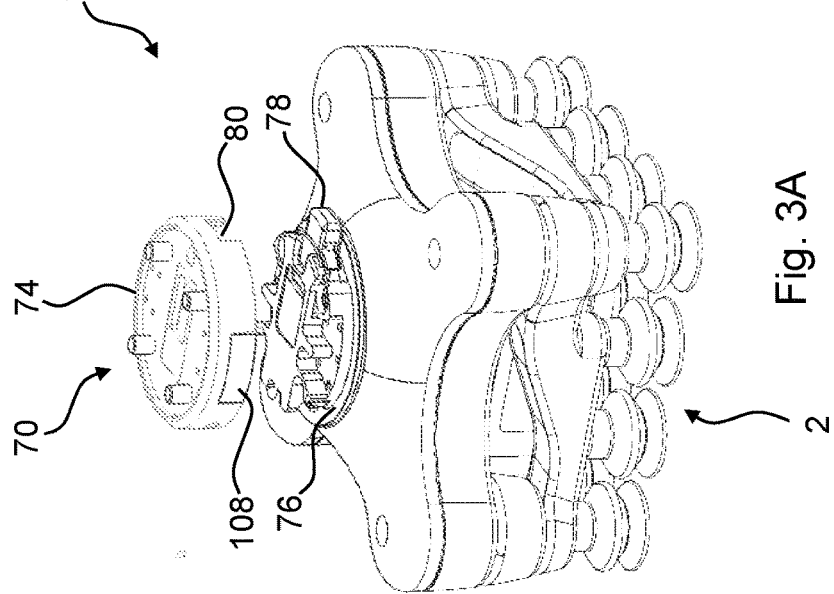
FIG. 3A shows a system comprising a gripping device according to the invention and a connector.

FIG. 3A illustrates a system 72 comprising a gripping device 2 and a connector 70 corresponding to the one explained with reference to FIG. 1A, FIG. 1B, FIG. 1C and FIG. 2A. The connector 70 comprises a second portion 76 being attached to the gripping device 2. A slidably arranged press element 78 protrudes from the second portion 76.

The connector 70 comprises a first portion 74 configured to be attached to a robot like shown in FIG. 6. The first portion 74 comprises a detachably attached plate 108 allowing mounting of an adaptor as explained with reference to FIG. 1A, FIG. 1B and FIG. 1C.

FIG. 3B illustrates the system 72 shown in FIG. 3A, in a configuration in which the connector 70 is being closed.

FIG. 3C illustrates the system 72 shown in FIG. 3B, in a configuration in which the connector 70 has been closed.

FIG. 4A illustrates a cross-sectional view of a connector 70 according to the invention. The connector 70 comprises a first portion 74 and a second portion 76 attached thereto. The connector 70 comprises a shaft 116 arranged in one end of the connector 70 and a recess 106 provided in the first portion 74. The recess 106 is arranged in the opposite end of the connector 70 than the shaft 116. It can be seen that the first connection portion 1 is provided in a position, provided in a distance D larger than half the length L of the connector 70 from the second connection portion 1'. In fact, the first connection portion 1 is provided in a position, provided in a distance D larger than two thirds of the length L of the connector 70 from the second connection portion 1'. Furthermore, it can be seen that the first connection portion 1 is provided in a position, provided in a distance D larger than three fourths of the length L of the connector 70 from the second connection portion 1'.

The first portion 74 is provided with a protruding structure 102 provided in the end of a slidably arranged engagement structure. The engagement structure is slidably arranged in a track structure 136. The protruding structure 102 is configured to be brought into engagement with the recess 106 hereby locking the first portion 74 relative to the second portion 76. A spring 104 is arranged in the track structure 136 and abuts the end wall of the track structure 136. The spring 104 extends into a bore provided in the engagement structure. Accordingly, the spring 104 is arranged to exert a force that will keep the protruding structure 102 of the engagement structure in engagement with the recess 106.

FIG. 4B illustrates a close-up view of a portion (the second connection portion 1') of the connector 70 shown in FIG. 4A. It can be seen that the protruding structure 102 has a contact surface 132 bearing against a corresponding contact surface 134 of the first portion 74. The spring 104 presses the protruding structure 102 outwardly so that the contact surface 132 of the protruding structure 102 is in contact with the contact surface 134 of the first portion 74. The angle θ between the contact surface of the protruding structure 102 and the longitudinal axis X' of the slidably arranged engagement structure is indicated.

The first portion 74 comprises an engagement structure 118 configured to be rotatably attached to a shaft 116 attached to the second portion 76.

FIG. 4C illustrates a situation in which a force F is applied to separate the first portion from the second portion. Accordingly, a normal force $F_2$ and a force $F_1$ extending perpendicular to the surface 134 is exerted by the contact surface 134 towards the other contact surface 132. The reaction forces $F'_1$, $F'_2$ (exerted by the contact surface 132 towards the other contact surface 134) are indicated. Furthermore, the spring force $F_S$ exerted by the spring 104 (shown in FIG. 4A) is indicated.

It is preferred that the second connection portion 1' is constructed in such a manner that the friction force (the force resisting the relative sliding motion of the contact surfaces 132, 134 relative to each other) has a magnitude that exceeds the magnitude of the reaction force $F'_1$. Hereby, it is possible to keep the protruding structure 102 in engagement with the recess 106 and keep the contact surfaces 132, 134 fixed to each other. In fact, it is possible to keep the contact surfaces 132, 134 fixed relative to each other independent on the spring force $F_S$. Since the friction force depends on the normal force $F_2$ and the coefficient of friction μ between the surfaces 132, 134, on the basis of knowledge of the coefficient of friction μ between the surfaces 132, 134, it is possible to determine the magnitude of the angle θ that will provide a self-locking second connection portion 1'. It is important to underline, that the angle θ needed for providing a self-locking second connection portion 1' does not depend on the force F applied when a user tries to separate the first portion 74 from the second portion 76 because both the magnitude of the friction force and the magnitude of the reaction force $F'_1$ are proportional to the force F as expressed in equation (1) and (2) below.

$$|F'_1| = |F|\sin(\theta) \tag{1}$$

$$|\text{Friction force}| = |F_2|\mu = |F|\cos(\theta)\mu \tag{2}$$

Hereby, it follows that the ration between the magnitude of the friction force and the magnitude of the reaction force $F'_1$ is constant as given by the following equation (3):

$$\frac{|\text{Friction force}|}{|F'_1|} = \frac{|F|\cos(\theta)\mu}{|F|\sin(\theta)} = \frac{\mu}{\tan(\theta)} \tag{3}$$

It can be seen, that the angle θ is approximately 15 degrees in FIG. 4B and in FIG. 4C.

In one embodiment it is preferred that the angle θ is within the range 5-30 degrees, preferably approximately 15 degrees. Hereby, it is possible to achieve an engagement between the contact surfaces 132, 134 that will prevent the surface 134 of the first portion 74 to provide a force large enough to press the protruding structure 102 out of engagement with the recess 106 when a force is applied to separate the first portion 74 from the second portion 76. Hereby, it is possible to provide a second connection portion 1' that is self-locking.

The second connection portion 1' is self-locking when magnitude of the friction force exceeds the magnitude of the reaction force $F'_1$ as expressed by the following equation (4):

$$|F'_1| < |\text{Friction force}| \tag{4}$$

By applying equation (3) it follows that $$\frac{|\text{Friction force}|}{\mu}\tan(\theta) = |F'_1| < |\text{Friction force}| \Rightarrow \tan(\theta) < \mu \tag{5}$$

From (5) it follows that $$\theta < \arctan(\mu) \tag{6}$$

Accordingly, in a preferred embodiment the angle θ is smaller than the inverse tangent function of the coefficient of friction μ.

Figure 5:
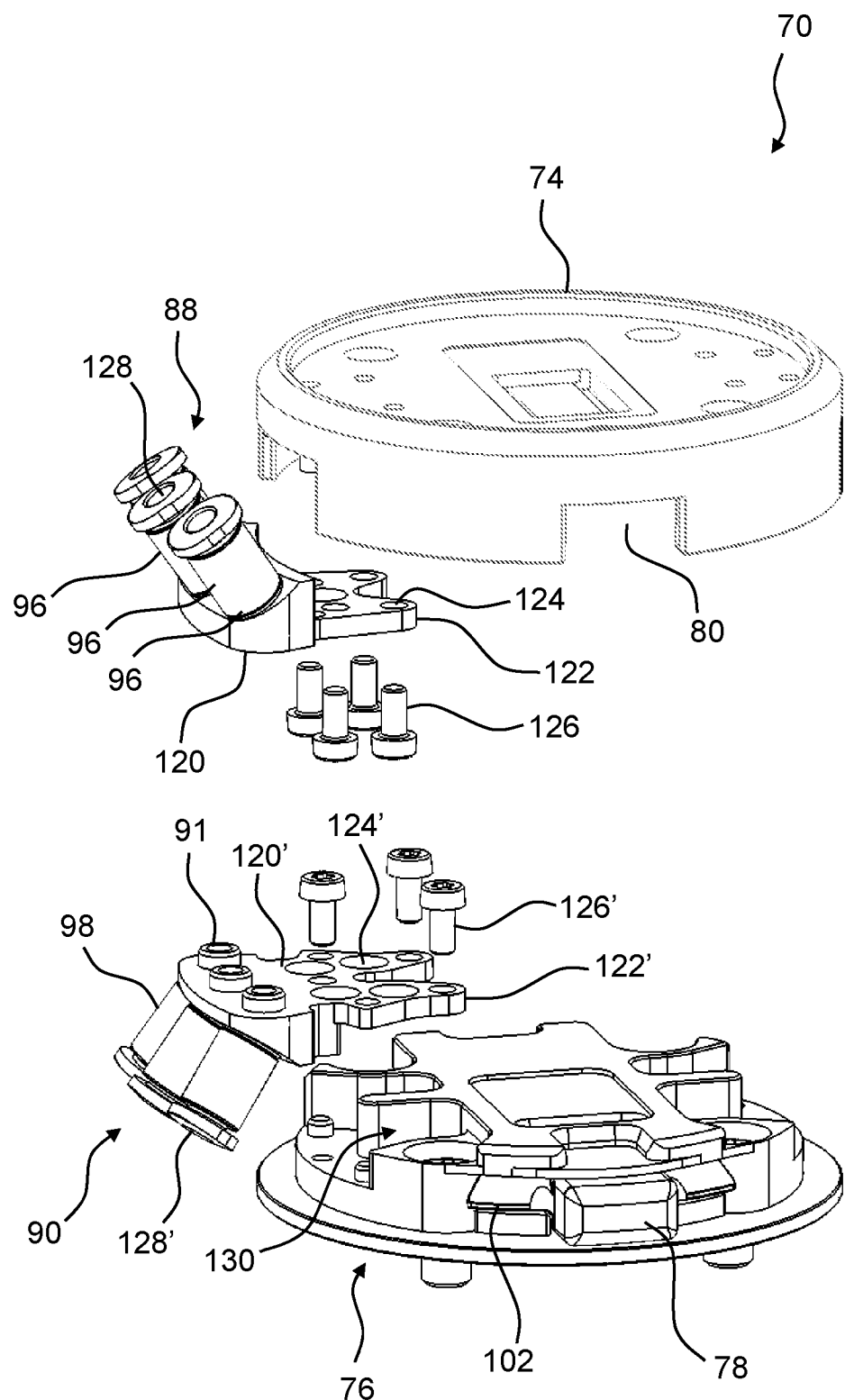
FIG. 5 shows an exploded view of a connector according to the invitation and an adaptor configured to be attached thereto.

FIG. 5 illustrates an exploded view of a connector 70 according to the invitation and an adaptor 86 configured to be attached thereto. The connector 70 comprises a second portion 76 provided with a slidably arranged slidably arranged engagement structure provided with a press element 78 in its distal end. The connector 70 comprises a first portion 74 provided with a slot 80 configured to receive the press element 78.

The first portion 74 is configured to be attached to a robot (as illustrates in FIG. 6) and a second portion 76 configured to be attached to a device 2 configured to be connected to the robot. The first portion 74 and the second portion 76 are detachably attached to each other by means of a hinge comprising a shaft (116 shown in FIG. 4A) and an engagement structure (118 shown in FIG. 4A) rotatably attached thereto.

The adaptor 86 is configured to be attached to the connector 70 and comprises a first connection part 88 configured to be attached to the first portion 74 of the connector 70 and a second connection part 90 configured to be attached to the second portion 76 of the connector 70. The adapter 86 comprises a number of connection structures 91 configured to connect the distal end of a first pipe or cable with the distal end of a second pipe or cable.

The first connection part 88 comprises an attachment plate 122 provided with holes 124 for receiving screws 126. Hereby, the attachment plate 122 can be attached to the first portion 74 of the connector 70. Likewise, the second connection part 90 comprises an attachment plate 122' provided with holes 124' for receiving screws 126'. Hereby, the attachment plate 122' can be attached to the second portion 76 of the connector 70.

The first connection part 88 comprises a support structure 120 provided with three holes 92 for inserting the distal end of a first pipe or cable. Likewise, the second connection part 90 comprises a support structure 120' provided with three holes 94 for inserting the distal end of a second pipe or cable.

The connection structures 91 are arranged to connect the distal end of a first pipe or cable inserted through the one or more holes 92 in the support structure 120 of the of the first connection part 88 and the distal end of a second pipe or cable being inserted through the one or more holes 94 in the support structure 120' of the of the second connection part 90.

The first portion 74 comprises a protruding structure 102 that is configured to be brought into engagement with a corresponding receiving recess (106 shown in FIG. 4A) provided in the second portion 76. The second portion 76 is provided with two receiving structures 130 configured to receive a corresponding attachment plate 122, 122' of the adaptor 86.

Three fitting 96 extend from the holes 92 in the support structure 120 of the first connection part 88. Likewise, three fittings 98 extend from the holes 94 in the support structure 120' of the second connection part 90. The fittings 96, 98 are provided with through-going holes 128, 128' allowing insertion of a pipe or cable through said through-going holes 128, 128'.

It may be an advantage to have a connector 70 for mechanically connecting a device 2 to a robot 20, wherein the connector 70 comprises a first portion 74 configured to be attached to the robot 20 and a second portion 76 configured to be attached to a device 2 configured to be connected to the robot 20, wherein the first portion 74 and the second portion 76 are detachably attached to each other by means of a hinge comprising a shaft 116 and an engagement structure 118 rotatably attached thereto, wherein a) the first portion 74 comprises a protruding structure 102 that is configured to be brought into engagement with a corresponding receiving recess 106 provided in the second portion 76 or b) the second portion 76 comprises a protruding structure 102 that is configured to be brought into engagement with a corresponding receiving recess 106 provided in the first portion 74, wherein the protruding structure 102 and the receiving recess 106 constitute a mechanical locking structure.

It may be beneficial that the connector 70 comprises a detachably attached adaptor 86 comprising a first connection part 88 and a second part 90, wherein the adapter 86 comprises one or more connection structures 91 configured to connect the distal end of a first pipe 100 or cable with the distal end of a second pipe 101 or cable.

It may be an advantage that the first portion 74 and the second portion 76 are provided with corresponding engagement structures 102, 106 constituting a snap-fit connection.

It may be beneficial that the connector 70 comprises a slideably arranged press element 78 arranged to unlock the engagement structures 102, 106 from each other by pressing the press element 78. Hereby, the press element 78 can be used to bring the engagement structures 102, 106 in a relative configuration in which the connector 70 can disassemble. This is important when the connector 70 has to be split into the first portion 74 and the second portion 76.

It may be an advantage that the connector 70 comprises a slideably arranged pull element arranged to unlock the engagement structures 102, 106 from each other by pulling the pull element. Hereby, the first portion 74 and the second portion 76 may be brought out of engagement by means of the pull element.

It may be beneficial that the connector 70 comprises a rotatably arranged rotation element that is arranged to unlock the engagement structures 102, 106 from each other by rotating the rotation element.

Hereby, the first portion 74 and the second portion 76 may be brought out of engagement by means of the rotation element.

It may be an advantage that the connector 70 is configured to receive one or more adaptors 86 hereby providing a detachably attachment of the one or more adaptors 86 to the connector 70.

It may be beneficial that the connector 70 comprises one or more receiving structures 130 configured to receive one or more corresponding attachment plates 122, 122' of the adaptor 86.

It may be an advantage that the connector 70 comprises a slot 80 provided in the outer structure of the first portion 74 or the second portion 76, wherein the slot 80 is configured to receive a press element 78, a rotation element or a pull element protruding from the first portion 74 or the second portion 76.

It may be beneficial that the first portion 74 comprises a protruding structure 102 that is configured to be brought into engagement with a corresponding receiving recess 106 provided in the second portion 76 or that the second portion 76 comprises a protruding structure 102 that is configured to be brought into engagement with a corresponding receiving recess 106 provided in the first portion 74.

It may be an advantage that the protruding structure 102 is part of a slidably arranged press element 78 provided in a track structure 136.

It may be beneficial that a spring 104 is arranged in the end portion of the track structure 136 and exerts an outwardly directed force on the press element 78.

Hereby, the press element 78 is kept in lockingly engagement with the receiving recess 106 until the force is exceeded by an opposing directed force applied to press the press element 78 into (e.g. in a direction towards the central portion of) the connector 70. Hereby, the protruding structure 102 will be moved radially inwards and the protruding structure 102 will be brought out of engagement with the receiving recess 106.

It may be an advantage that the first portion 74 comprises a detachably attached plate 108 allowing mounting of an adaptor 86 or that the second portion 76 comprises a detachably attached plate 108 allowing for mounting of an adaptor 86.

It may be beneficial that receiving recess 106 is provided in the opposite side of the connector 70 than the shaft 116.

It may be an advantage to have an adaptor 86 configured to be attached to a connector 70 comprising a first portion 74 configured to be attached to a robot 20 and a second portion 76 configured to be attached to a gripping device 2, wherein the adaptor 86 comprises a first connection part 88 configured to be attached to the first portion 74 of the connector 70 and a second connection part 90 configured to be attached to the second portion 76 of the connector 70, wherein the adapter 86 comprises one or more connection structures 91 configured to connect the distal end of a first pipe 100 or cable with the distal end of a second pipe 101 or cable.

The adaptor may comprise connection structures enabling that adjacent pipe ends, or adjacent cable ends can be connected. Hereby it is possible to apply the adaptor to establish connection between single wires, cables with multiple wires or pipes from the robot and the gripping device or an alternative device, respectively.

It may be beneficial that the first connection part 88 comprises an attachment plate 122 provided with holes 124 for receiving screws 126. Hereby, the attachment plate 122 can be attached to the first portion 74 of the connector 70.

It may be an advantage that the second connection part 90 comprises an attachment plate 122' provided with holes 124' for receiving screws 126'. Hereby, the attachment plate 122' can be attached to the second portion 76 of the connector 70.

It may be an advantage that the first connection part 88 comprises a support structure 120 provided with one or more holes 92 for inserting the distal end of a first pipe 100 or cable.

It may be beneficial that the second connection part 90 comprises a support structure 120' provided with one or more holes 94 for inserting the distal end of a second pipe 101 or cable.

It may be an advantage that the connection structures 91 are arranged to connect the distal end of a first pipe 100 or cable inserted through the one or more holes 92 in the support structure 120 of the of the first connection part 88 and the distal end of a second pipe 101 or cable being inserted through the one or more holes 94 in the support structure 120' of the of the second connection part 90.

It may be beneficial that a fitting 96 extends from one or more of the holes 92 in the support structure 120 of the first connection part 88 and/or that a fitting 98 extends from one or more of the holes 94 in the support structure 120' of the second connection part 90.

It may be an advantage that a fitting 96 extends from one or more of the holes 92 in the support structure 120 of the first connection part 88 and that a fitting 98 extends from one or more of the holes 94 in the support structure 120' of the second connection part 90.

It may be beneficial that the connection structures 91 are provided with sealing structures configured to establish an air tight connection between the distal end of a first pipe 100 inserted through a hole 92 in the support structure 120 of the of the first connection part 88 and the distal end of a second pipe 101 (see FIG. 1A, FIG. 1B or FIG. 1C) inserted a hole 94 in the support structure 120' of the of the second connection part 90.

It may be an advantage that the attachment plate 122 of the first portion 74 comprises a planar surface configured to abut against a corresponding planar surface of the attachment plate 122' of the second portion 76.

Figure 6A:
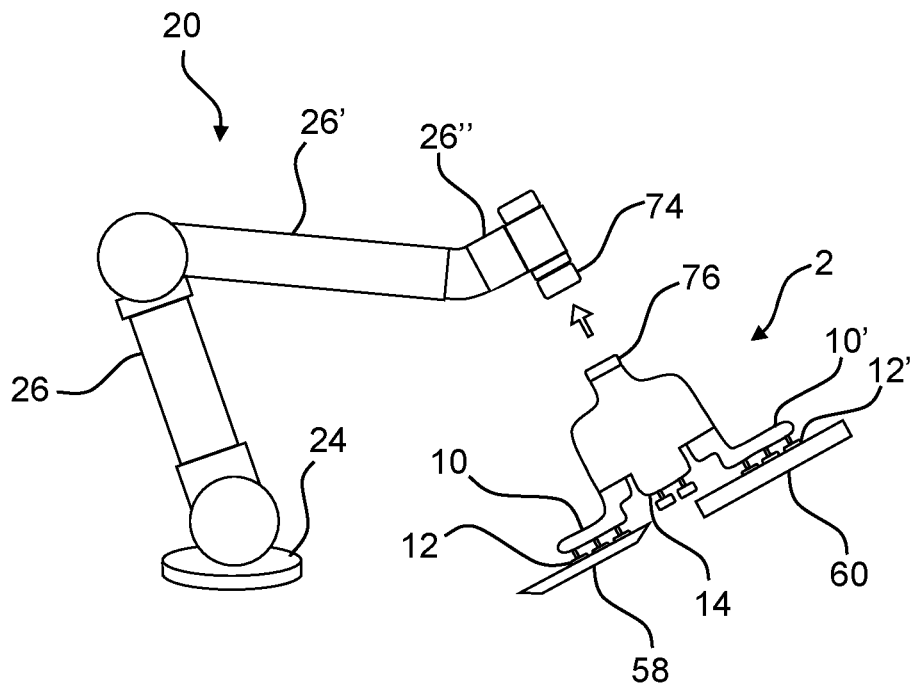
FIG. 6A shows a gripping device being mounted on a collaborative robot.

FIG. 6A illustrates a gripping device 2 according to the invention being mounted on a collaborative robot 20. The robot 20 comprises a base 24 and a first arm 26 rotatably attached to said base 24. The robot 20 comprises a second arm 26' rotatably attached to the first arm 26. The robot 20 moreover comprises a third arm 26" rotatably attached to the second arm 26'. A first portion 74 is provided at the end of the third arm 26". The first portion 74 is configured to receive a corresponding second portion 76 attached to the gripping device 2. The first portion 74 and the corresponding second portion 76 may constitute a connector according to the invention (see FIG. 1A, FIG. 1B, FIG. 1C and FIG. 2A).

The gripping device 2 comprises a body portion and a plurality of extremities 10, 10' moveably attached to the body portion of the gripping device 2. The first extremity 10 is provided with a plurality of suction members 12 gripping a first object 58 by providing a negative pressure in the suction members 12.

The second extremity 10' is provided with a plurality of suction members 12' gripping a second object 60 by providing a negative pressure in the suction members 12'. The gripping device 2 comprises a centrally arranged support portion 14 provided with several suction members.

In one preferred embodiment according to the invention, the gripping device 2 is configured to control the pressure provided at different sections of the suctions members 12, 12' of the gripping device 2 independently of each other. This means that one portion of the gripping device 2 (e.g. the suction members 12 of a first section of the extremities 10, 10') are controlled differently than another portion of the gripping device 2 (e.g. the suction members 12' of a second section of the extremities 10, 10'). Hereby, it is possible to apply a single gripping device 2 to handle several objects 58, 60. This may be established by applying a gripping device 2 having a first valve (not shown) to control the pressure in the suction members 12 of a first section of the extremities 10, 10' and another valve (not shown) to control the pressure in the suction members 12' of another section of the extremities 10, 10'. The valves may be controlled by a control signal delivered by the robot 20.

Accordingly, the gripping device 2 may use one or more first extremities 10 to grip a first object being moved from a first working area to a second working area, whereas the gripping device 2 may use one or more other extremities 10' to grip a second object being moved from the second working area on the way back to the first working area.

Alternatively, the gripping device 2 may comprise several individually controlled pumps connected to different portions of the gripping device 2. Accordingly, the different pumps may be used to provide different pressure as function of time.

Figure 6B:
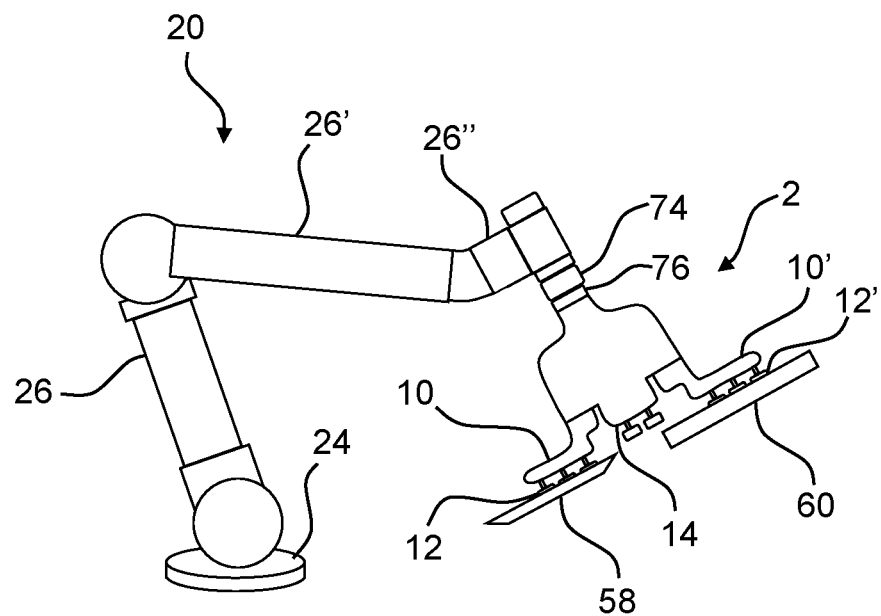
FIG. 6B shows the gripping device shown in FIG. 6A when it has been mounted on the collaborative robot.

FIG. 6B illustrates the gripping device 2 shown in FIG. 6A when the gripping device 2 has been mounted on the collaborative robot 20.

LIST OF REFERENCE NUMERALS

1 First connection portion
1' Second connection portion
2 Gripping device
4, 4' Fixation portion
5 Body portion
10, 10' Extremity
14 Support portion
20 Robot
24 Base
26, 26', 26" Arm
58 Object
60 Object
70 Connector
72 System
74 First portion
76 Second portion
78 Press element
80 Slot
82, 82', 82", 82'" Screw
84, 84', 84", 84'" Screw
86 Adaptor
88 First connection part
90 Second connection part
91 Connection structure
92, 94 Hole
96, 98 Fitting
100 Air tube
101 Air tube 102 Protruding structure
104 Spring
106 Receiving recess
108 Plate
110, 110' Joint
112 Structure
114 Dividing structure
116 Pin/shaft
118 Engagement structure
120, 120' Support structure
122, 122' Attachment plate
124, 124' Hole
126, 126' Screw
128, 128' Hole
130 Receiving structure
132 Contact surface
134 Contact surface
136 Track structure
X' Axis
θ Angle
L Length
D Distance
F, $F_1$, $F_S$, $F_2$, $F'_1$, $F'_2$ Force
μ Coefficient of friction

The invention claimed is:

1. A connector for mechanically connecting a device to a robot, wherein the connector comprises a first portion configured to be attached to the robot and a second portion configured to be attached to a device configured to be connected to the robot, wherein the first portion and the second portion are detachably attached to each other by means of:
   a) a first connection portion constituting a rotational system comprising a pivot about which the first portion can rotate with respect to the second portion and
   b) a second connection portion constituting a mechanical locking structure that prevents the first portion and the second portion from being detached from each other, the second connection portion further comprising:
      a protruding structure having at least one protruding structure contact surface and a longitudinal axis and
      a receiving recess formed by at least one recess contact surface configured to bear against the at least one protruding structure contact surface of the protruding structure,
   wherein the surfaces are angled relative to the longitudinal axis in such a manner that the friction force between the contact surfaces has a magnitude that ensures that the resulting force acting on the protruding structure is sufficiently large to keep the protruding structure in engagement with the recess, wherein the connector comprises the protruding structure forming part of a slidably arranged press element provided in a track structure.

2. A connector according to claim 1, wherein the first connection portion constitutes a pivot joint, preferably a pivot joint comprising a first pivot structure and a second engaging pivot structure arranged to rotate with respect to the first pivot structure.

3. A connector according to claim 2, wherein the connector comprises an adaptor comprising a first connection part and a second connection part, wherein the adapter comprises one or more connection structures configured to connect the distal end of a first pipe or cable with the distal end of a second pipe or cable.

4. A connector according to claim 3, wherein the connector comprises a rotatably arranged rotation element that is arranged to unlock the engagement structures from each other by rotating the rotation element.

5. A connector according to claim 1, wherein the first portion and the second portion are provided with corresponding engagement structures constituting a snap-fit connection.

6. A connector according to claim 5, wherein the connector comprises a slideably arranged press element arranged to unlock the engagement structures from each other by moving the press element.

7. A connector according to claim 1, wherein the connector is configured to receive one or more adaptors hereby providing a detachably attachment of the one or more adaptors to the connector.

8. A connector according to claim 7, wherein the connector comprises one or more receiving structures configured to receive one or more corresponding attachment plates of the adaptor.

9. A connector according to claim 1, wherein a spring is arranged in the end portion of the track structure and exerts an outwardly directed force on the protruding structure.

10. A connector according to claim 1, wherein the connector has a diameter and the first connection portion is provided in a position, provided in a distance larger than half the diameter of the connector from the second connection portion.

11. A connector for mechanically connecting a device to a robot, wherein the connector comprises:
   a first portion configured to be attached to the robot, said first portion further comprising:
      a rotatable engagement structure; and
      a receiving recess formed by at least one contact surface;
   a second portion configured to be attached to a device configured to be connected to the robot, wherein the first portion and the second portion are detachably attached to each other, said second portion further comprising:
      a pivot for engaging with the rotatable engagement structure; and
      a protruding structure having a longitudinal axis and at least one contact surface configured to bear against the at least one contact surface of the receiving recess structure;
   wherein the surfaces are angled relative to the longitudinal axis in such a manner that the friction force between the contact surfaces has a magnitude that ensures that the resulting force acting on the protruding structure is sufficiently large to keep the protruding structure in engagement with the recess, wherein the connector comprises the protruding structure forming part of a slidably arranged press element provided in a track structure.

12. A connector according to claim 11, wherein the connector comprises an adaptor comprising:
   a first connection part configured to be attached to the first portion; and
   a second connection part, configured to be attached to the second portion;
   wherein the adapter comprises one or more connection structures configured to connect the distal end of a first pipe or cable with the distal end of a second pipe or cable.

13. A connector according to claim 11, wherein the connector comprises:

a slideably arranged press element arranged to unlock the first portion from the second portion by moving the press element.

14. A connector according to claim 11, wherein a spring is arranged in the end portion of the track structure and exerts an outwardly directed force on the protruding structure.

15. A connector according to claim 11, wherein the rotatable engagement structure and pivot are provided in a first position and the receiving recess and protruding structure are provided in a second position, and a distance between the first position and the second position is larger than half the length of the connector from the second connection portion.

* * * * *